UNITED STATES PATENT OFFICE.

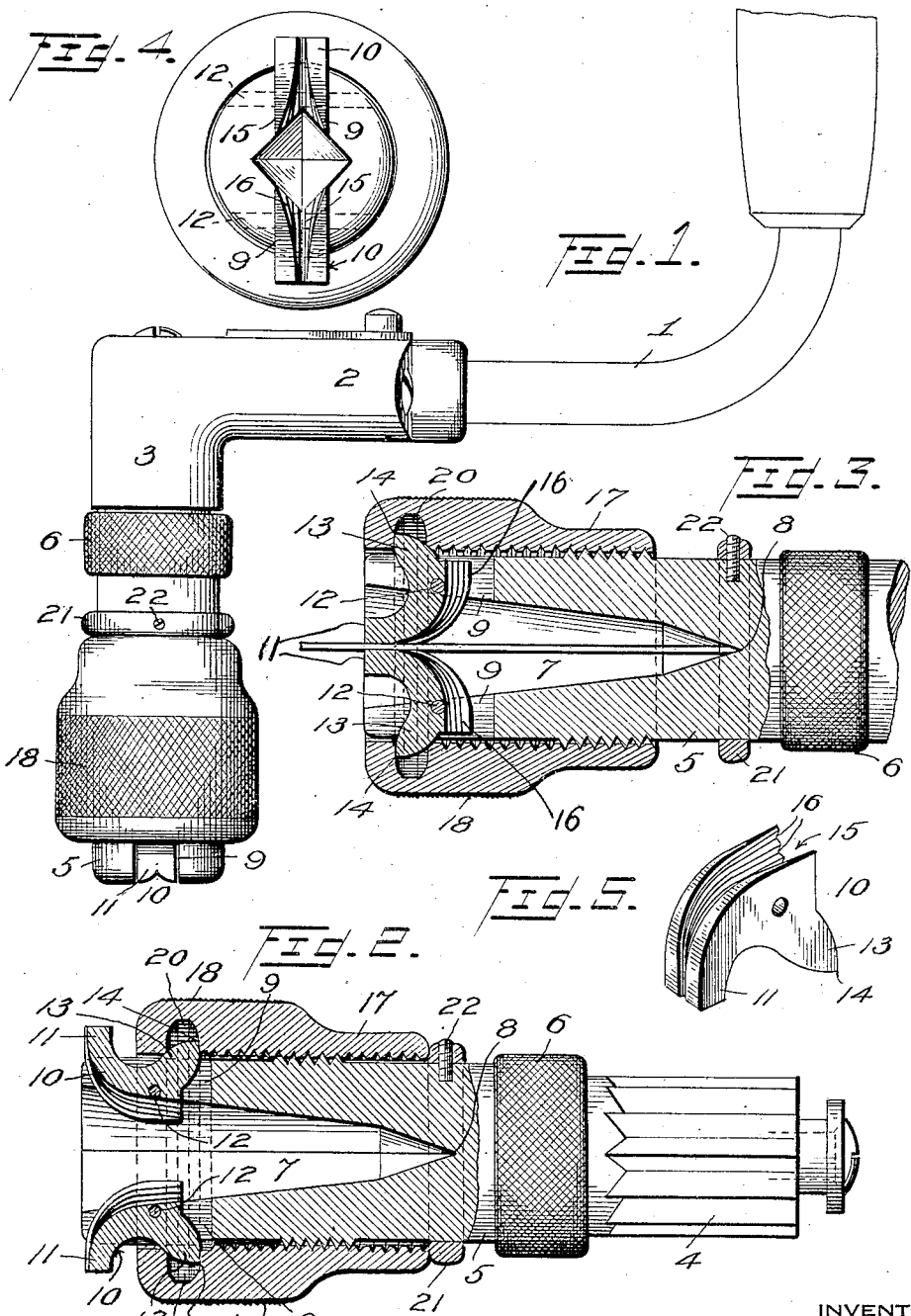

ADDISON B. CARLL, OF NEW YORK, N. Y.

BIT-CHUCK.

1,363,953.  Specification of Letters Patent.  Patented Dec. 28, 1920.

Application filed January 17, 1920. Serial No. 352,188.

*To all whom it may concern:*

Be it known that I, ADDISON B. CARLL, citizen of the United States, residing at New York, in the county of New York and State of New York, have invented new and useful Bit Chucks, of which the following is a specification.

This invention relates to bit chucks for braces.

The object is to provide means for holding bits or other similar tools in the heads of braces, breast drills and the like, wherein there are no parts or springs which are liable to become loose or detached, and wherein pivoted cam-shaped jaws are eccentrically mounted in the stationary tool-head to be directly actuated by a longitudinally movable sleeve for opening or closing the jaws, thus giving a positive action to such jaws to clamp or release shanks of various sizes and eliminating any lost motion of the same.

Another object is to provide a clamping bit-chuck for braces having means for longitudinally alining and centering the bit for true and accurate boring, said chuck, when the bit is in clamped position, having no projecting parts surrounding the shank of the same so that it is possible to clamp the said bit closer to the work.

A further object is to provide a chuck of this character having a minimum number of parts which may be easily exposed for renewal, in the event of breakage, and which are easily operable for clamping or unclamping the shanks of bits or other tools.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed and modified, so long as such changes and modifications mark no material departure from the salient features of the invention, as specifically pointed out in the appended claims.

In the drawing, in which similar reference characters designate corresponding parts throughout the several figures, Figure 1 is a side elevation of the chuck end of a carpenter's brace, having the improved chuck incorporated therein;

Fig. 2 is an enlarged longitudinal section through the tool-head thereof removed from the brace and showing the ratchet in elevation, the clamping jaws being in their open position;

Fig. 3 is a similar view showing the jaws in closed position and clamping the shank of a small tool;

Fig. 4 is an end elevation of the chuck, and

Fig. 5 is a detail perspective view of one of the clamping jaws.

In braces now in common use, considerable difficulty is encountered in setting the squared, tapered shank of the bit in the exact position required within the tool head, to be properly grasped and clamped by the jaws located therein, it being necessary to feel around within the tool without the aid of sight. In the device of the present invention this trouble is eliminated; moreover, the short jaws employed herein and the manner of mounting the same, materially shorten the head of the brace, so that the distance between the point of application of the tool to the work, and the operator, is correspondingly shortened and the brace thereby made appreciably steadier and more easily controlled than is the ordinary style of brace.

Another feature of the invention resides in the fact that the gripping or clamping jaws are in the form of rocker members pivoted within the head by means of pivots located between the ends of the said jaws, so that while the latter may be spread apart sufficiently to accommodate the shank of the largest tool used for such purpose, the movement longitudinally of the tool-head is very short; while by a retrograde movement of the actuating member, the said jaws may be made to grasp the shank of a bit of the smallest diameter in such a way as to positively hold the same in the exact axis of rotation.

In Fig. 1 of the drawing there is illustrated, in outline, the lower portion of an ordinary brace, the same being secured in any desired manner, as by screwing, to the right-angle extension 2 of the elbow 3, the extension being large enough and so shaped as to house a certain ratchet mechanism for actuating the tool-head in the desired manner, said ratchet mechanism being the subject matter of a co-pending application Serial No. 352,189 filed of even date herewith.

The elbow 3 is of tubular formation, and is adapted to receive the ratchet end 4 of a rotatable tool-head or body 5, whose longitudinal axis is in alinement with the axis of rotation of the brace. The head 5 is composed of a solid round bar of steel or other suitable metal having the said ratchet 4 at its inner end, provided with a knurled integral band or enlargement 6 intermediate of its length and adapted to be grasped by the free hand of the operator to steady the brace, when the step-by-step or ratchet movement of the same is being employed.

At that end of the tool-head 5 remote from the ratchet 4, external screw threads are provided for a purpose to be explained; and the said head is provided throughout the major portion of its lower end with a tapered socket 7, square in cross section, as clearly shown in Fig. 4 of the drawing and brought to a point, as indicated at 8, at the exact center of rotation of the head 5, the square cross-sectional shape being continued to said point 8. In some cases, a round tapered socket may answer.

At its outer end, the walls of the head 5 surrounding the large end of the socket 7 are cut to form diametrically opposite slots 9 for the reception of a pair of co-acting rockable quadrant-shaped jaws or clamping members 10 which project, at all times, into the mouth or large end of the said socket 7. Each jaw 10 is formed of hardened tool steel in such manner as to provide a curved tail 11 extending toward the adjacent lower or outer end of the head, each tail gradually thickening to an intermediate point of the jaw where they are provided with transverse apertures for the reception of pivot pins 12, which also traverse suitable apertures formed in the walls of the slots 9. The pins 12 are arranged in parallel relation and located close to the walls of the socket 7 substantially mid-way of the length of the slots 9.

The bodies of the jaws 10 are extended inwardly somewhat beyond the pivot pins 12, and are provided with integral outwardly extending lugs or teeth 13, said lugs having each a point 14. The teeth 13 lie, when the said jaws are open, as in Fig. 2, at an angle of about forty-five degrees relative to the plane of the pivot pins 12, and when the jaws are closed, as in Fig. 3, they lie at an angle of forty-five degrees in the opposite direction, the said points 14, at all times, extending somewhat beyond the periphery of the head 5.

The pivot pins 12 are located eccentrically to the inner arcuate walls of the jaws so that when the latter are rocked from the position of Fig. 2 to that of Fig. 3 the tails 11 approach the center of the socket 7 and thus grasp any article interposed therebetween. The tails of the jaws extend beyond the said periphery when the jaws are open to the limit of their movement, but not beyond the adjacent end of the head and, when the jaws are closed, the tail ends lie substantially flush with the end of the said head, as clearly illustrated in Fig. 3.

The inner opposed arcuate faces of the jaws are grooved longitudinally, as indicated at 15, the said grooves being substantially the full width of the jaws at their inner ends and gradually decreasing in depth and narrowing in width toward the outer ends of the same for the purpose of presenting as the jaws are rocked upon their pivots, different sized seats for receiving and clamping different tools that may be inserted in the head. The grooves 15 are generally L-shaped in cross-section so as to accommodate together the square heads of tool-shanks. In order that the jaws may be employed to more effectually grasp or clamp round objects, the said grooves are provided with a series of longitudinally disposed serrations 16, which thus provide projecting points to bite into and securely hold a round object, as will be clearly understood. When the socket 7 is made round in cross-section, the grooves 15 should also be round.

A revolving and longitudinally movable actuating sleeve 17 is mounted upon the head 5, the said sleeve being provided with internal screw threads for engagement with the aforementioned threads upon the head 5, and being provided with an enlarged outer end, knurled as at 18, to facilitate the turning movement thereof to project the same toward or away from the end of the head.

Near its outer end, the sleeve 17 is provided, in its inner wall, with an annular groove 20, into which the aforesaid lugs 13 of the jaws 10 project at all times, the extent of projection depending upon the position of the latter. It will be seen that as the sleeve is moved forwardly or backwardly upon the head, the jaws will be caused to rock in a positive manner and, by reason of their eccentric mounting upon the pivots 12, will have a wedging action upon the shank of the tool or other object being held.

In order to limit the inward movement of the sleeve 17 upon the head, so as to prevent the disengagement of the sleeve and the jaws, an annular ring 21 is secured to the said head, as by a screw 22, which may be removed and the ring 21 slid back along said head, in order to permit of the sleeve being moved back to completely uncover the jaws, when it is desired to drive out the pivot pins 12 for the purpose of renewing or replacing one or both of the jaws in the event of breakage. The screw 22 may be used alone as a stop for the sleeve. It will be seen that the outward movement of the sleeve 17 is limited by the meeting of the jaws 10, whose teeth 13 are within the internal annular groove 20 when the jaws 10 are in clamping relation, thus the removal of the sleeve is prevented until the said jaws are removed from their seats within the slots 9.

The principal feature of the present invention is the mounting of the jaws and the peculiar shape of the same. These jaws may grip at any point along their grooved faces 15 and these arcuate grooved faces, it will be remembered, equal a quadrant in extent. The pivots 12 of each jaw are much nearer the gripping faces than they are the opposite sides of the jaws and are considerably nearer that end of the jaws having the wide gripping face than the tail end 11 of the jaws. In other words, the pivots are eccentric relative to the arcuate gripping faces. Each pivot is set within the slot 9 at a point near the socket 7 and, therefore, spaced a distance nearly equal to the depth of said slot from the periphery of the head. The spacing of the pivots from the mouth of the socket is such that in both of the extreme positions of the jaws, i. e. when wide open and when completely closed, the jaws are comprehended within the length of the head or, in other words, do not project beyond the lower or working end of said head. In other words, the distance of each pivot from the lower end of the head is nearly equal to, though less than, the distance from the most remote point of the jaw. Two opposite pivots are spaced apart from each other a distance less than twice the length from the pivot to the remote end of the jaw, whereby when the jaws are closed they meet in the exact center of the socket at the entrance or mouth thereof to exert a clamping action on tools of small dimensions.

From the foregoing it will be seen that a simple, cheaply manufactured and easily operated chuck for holding bits or other tools in braces has been provided, in which it is only necessary to introduce the shank of the tool, whether square or round and having a head thereon or not, into the opening between the jaws and project the same into the tapered socket as far as it will go. The tool will be accurately centered with relation to the axis of rotation of the tool-head and in exact longitudinal alinement with the same. Then by turning the sleeve 17 in a direction to project the same toward the end of the head, the jaws are caused to rigidly clamp the tool in position. While only two of the jaws are shown and described, it is to be understood that three or more may be mounted in the tool-head in radial positions and in the same manner as described. I do not wish to limit myself to the specified use for the bit or tool chuck.

What is claimed is:

1. A chuck comprising a tool head which has exterior screw-threads intermediate its length, a tool receiving socket provided in the head and tapering continuously from its entrance or mouth to a point interior of the head, a plurality of radial slots in the head at the lower or working end thereof, said slots opening into said socket, a jaw pivotally mounted in each slot, each jaw having an arcuate gripping face approximating a quadrant, the pivot of each jaw being eccentric relative to the arcuate gripping face and located nearer said face than the opposite side of the jaw and nearer one end of the jaw than the other, said pivot being nearer to the socket than to the periphery of the head and spaced from the lower end of the head a distance nearly equal to the distance from the most remote point of the jaw to its pivot, a tooth forming a part of each jaw and extending on the opposite side of the pivot from the gripping face, said tooth projecting outwardly from its slot in all positions of the jaw, a sleeve having an annular groove of a size to receive only the projecting portion of the tooth, said sleeve engaging with the screw-threads of the head whereby when the sleeve is rotated, the jaws are together moved through an arc approximating ninety degrees.

2. A chuck comprising a tool head which has exterior screw-threads intermediate its length, a tool receiving socket provided in the head and tapering continuously from its entrance or mouth to a point interior of the head, a plurality of radial slots in the head at the lower or working end thereof, said slots opening into said socket, a jaw pivotally mounted in each slot, each jaw having an arcuate gripping face approximating a quadrant, said gripping face having a groove therein, said groove having its least width and depth at the end of the jaw farthest from the pivot and increasing in both depth and width uniformly to the opposite end of the gripping face, the entire arcuate gripping face being active to hold tools of varying sizes when the jaws are clamped, the pivot of each jaw being eccentric relative to the arcuate gripping face and located nearer said face than the opposite side of the jaw and nearer one end of the jaw than the other, each pivot being nearer to the socket than to the periphery of the head and spaced from the lower end of the head a distance nearly equal to the distance from the most remote point of the jaw to its pivot, a tooth forming a part of each jaw and on the opposite side of the pivot from the gripping face, said tooth projecting outwardly from its slot in all positions of the jaw, a sleeve having an annular groove adapted to receive only the projecting portion of the tooth, said sleeve engaging with the screw-threads of the head whereby when the sleeve is rotated the jaws are together moved through an arc approximating ninety degrees.

3. A chuck comprising a tool head which has exterior screw-threads intermediate its length, a tool receiving socket provided in the head and tapering continuously from its entrance or mouth to a point interior of the head, a plurality of radial slots in the head at the lower or working end thereof, said slots opening into said socket, a jaw pivotally mounted in each slot, each jaw having an arcuate gripping face approximating a quadrant, the pivot of each jaw being eccentric relative to the arcuate gripping face and located nearer said face than to the opposite side of the jaw and nearer one end of the jaw than the other, each pivot being nearer to the socket than to the periphery of the head and spaced from the lower end of the head a distance nearly equal to the distance from the most remote point of the jaw to its pivot, the opposite pivots being spaced apart a distance less than twice the distance of each pivot from the most remote point of the jaw, a tooth forming a part of each jaw and on the opposite side of the pivot from the gripping face, said tooth projecting outwardly from its slot in all positions of the jaw, a sleeve having an annular groove of a size to receive the projecting portion of the tooth, said sleeve engaging with the screw-threads of the head whereby when the sleeve is rotated the jaws are together moved through an arc approximating ninety degrees, and stop means provided on the head and adapted to prevent movement of the sleeve longitudinally of the head beyond the point at which the tooth would become disengaged with the annular groove, the most remote portions of the jaws when the sleeve is engaged with the stop means projecting radially out of the slots to be comprehended within the length of the head, said jaws when closed meeting in the center of the socket at the open mouth thereof and acting as a stop to prevent further downward movement of the sleeve.

In testimony that I claim the foregoing as my own I have hereto affixed my signature in the presence of two witnesses.

ADDISON B. CARLL.

Witnesses:
   JOHN A. DAVISON,
   S. LOUISE GEE.